United States Patent
Lee et al.

(10) Patent No.: US 8,467,329 B2
(45) Date of Patent: Jun. 18, 2013

(54) METHOD OF TRANSMITTING SYSTEM INFORMATION RELATED TO POINT-TO MULTIPOINT SERVICE

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/914,523

(22) Filed: Oct. 28, 2010

(65) Prior Publication Data

US 2011/0103288 A1    May 5, 2011

Related U.S. Application Data

(60) Provisional application No. 61/256,294, filed on Oct. 29, 2009.

(51) Int. Cl.
*H04H 20/71* (2008.01)
*H04L 12/28* (2006.01)
*H04W 4/00* (2009.01)

(52) U.S. Cl.
USPC .................. 370/312; 370/390; 455/422.1

(58) Field of Classification Search
None
See application file for complete search history.

(56) References Cited

U.S. PATENT DOCUMENTS

| 8,254,932 | B2* | 8/2012 | Hsu ............................. 455/436 |
| 8,270,332 | B2* | 9/2012 | Aoyama et al. ................ 370/312 |
| 2009/0221293 | A1* | 9/2009 | Petrovic et al. ............... 455/450 |
| 2011/0194428 | A1* | 8/2011 | Wang et al. ................... 370/252 |
| 2011/0194477 | A1* | 8/2011 | Damnjanovic et al. ....... 370/312 |

OTHER PUBLICATIONS

3GPP TS 36.212 V8.7.0 (Jun. 2009), LTE; Evolved Universal Terrestrial Radio Access (E-UTRA); Multiplexing and channel coding, pp. 43-55.*

* cited by examiner

*Primary Examiner* — Faruk Hamza
*Assistant Examiner* — Cassandra Decker
(74) *Attorney, Agent, or Firm* — Morgan, Lewis & Bockius LLP

(57) ABSTRACT

A method of receiving system information performed by a user equipment (UE) is provided. The method includes receiving, from a network, an indicator indicating a change of system information related to a point-to-multipoint service on a physical control channel, and receiving changed system information related to the point-to-multipoint service in response to the indication.

12 Claims, 10 Drawing Sheets

METHOD OF TRANSMITTING SYSTEM INFORMATION RELATED TO POINT-TO MULTIPOINT SERVICE

CROSS-REFERENCE TO RELATED APPLICATIONS

This application claims the benefit of priority of U.S. Provisional Application No. 61/256,294 filed on Oct. 29, 2009, which is incorporated by reference in their entirety herein.

BACKGROUND

1. Field of the Invention

The present invention is related to a wireless communication, and more particularly to a method of transmitting system information related to a point-to-multipoint service.

2. Related Art

Similarly to a conventional cell broadcast service (CBS), a point-to-multipoint service such as multimedia broadcast/multicast service (MBMS) simultaneously transmits a data packet in the same manner to a plurality of users. The CBS is a low-speed message-based service whereas the MBMS aims at high-speed multimedia data transmission. Further, the CBS is not based on an Internet protocol (IP) whereas the MBMS is based on IP multicast. If users satisfying a specific level exist in the same cell, necessary resources (or channels) transmitted to each user are shared so that a plurality of users can receive the same multimedia data. Therefore, the MBMS has an advantage in that radio resources can be more efficiently used and a multimedia service can be used at a low price from the perspective of the users.

The MBMS uses a common channel so that a plurality of user equipments (UEs) effectively receive data of one service. That is, regarding the data of one service, only one common channel is allocated instead of allocating a predetermined number of dedicated channels corresponding to the plurality of UEs which intend to receive the service in one cell. Since the plurality of UEs simultaneously receive the common channel, efficiency of radio resources increases.

There are many differences between MBMS and unicast service in terms of radio bearers, radio resources, scheduling parameters, transport channels, frame structures, etc. Therefore, system information needs to be separated between MBMS UEs and non-MBMS UEs because non-MBMS UEs doesn't always have to receive MBMS data. And notifying the changes of system information for MBMS and non-MBMS should be performed in different ways.

SUMMARY

The present invention provides a method of transmitting system information related to a point-to-multipoint service.

According to an aspect of the present invention, a method of receiving system information performed by a user equipment (UE) is provided. The method includes receiving, from a network, an indicator indicating a change of system information related to a point-to-multipoint service on a physical control channel, and receiving changed system information related to the point-to-multipoint service in response to the indication.

The method further comprises receiving MBMS control information through a Multicast Control Channel (MCCH) based on the changed system information related to the point-to-multipoint service.

According to another aspect of the present invention, a method of transmitting system information performed by a network is provided. The method includes receiving, to a user equipment (UE), an indicator indicating a change of system information related to a point-to-multipoint service on a physical control channel, and transmitting, to the UE, changed system information related to the point-to-multipoint service after transmitting the indication.

The method further comprises transmitting MBMS control information through a Multicast Control Channel (MCCH) after transmitting the changed system information related to the point-to-multipoint service.

DESCRIPTION OF EXEMPLARY EMBODIMENTS

Hereinafter, a method of receiving multimedia broadcast/multicast service (MBMS) and a method of transmitting the MBMS will be described according embodiments of the present invention.

Figure 1:
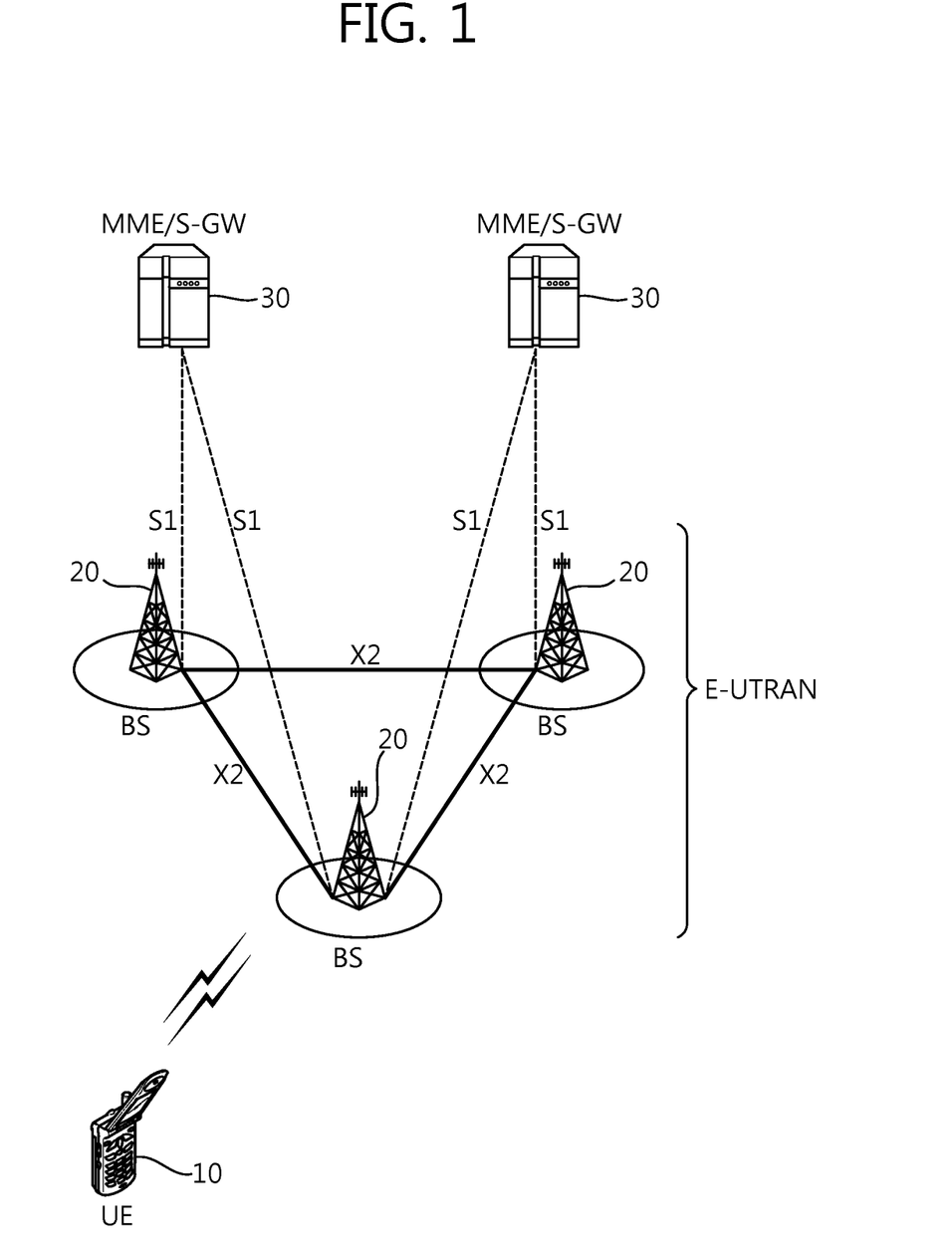
FIG. 1 is a block diagram showing a wireless communication system.

FIG. 1 is a block diagram showing a wireless communication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
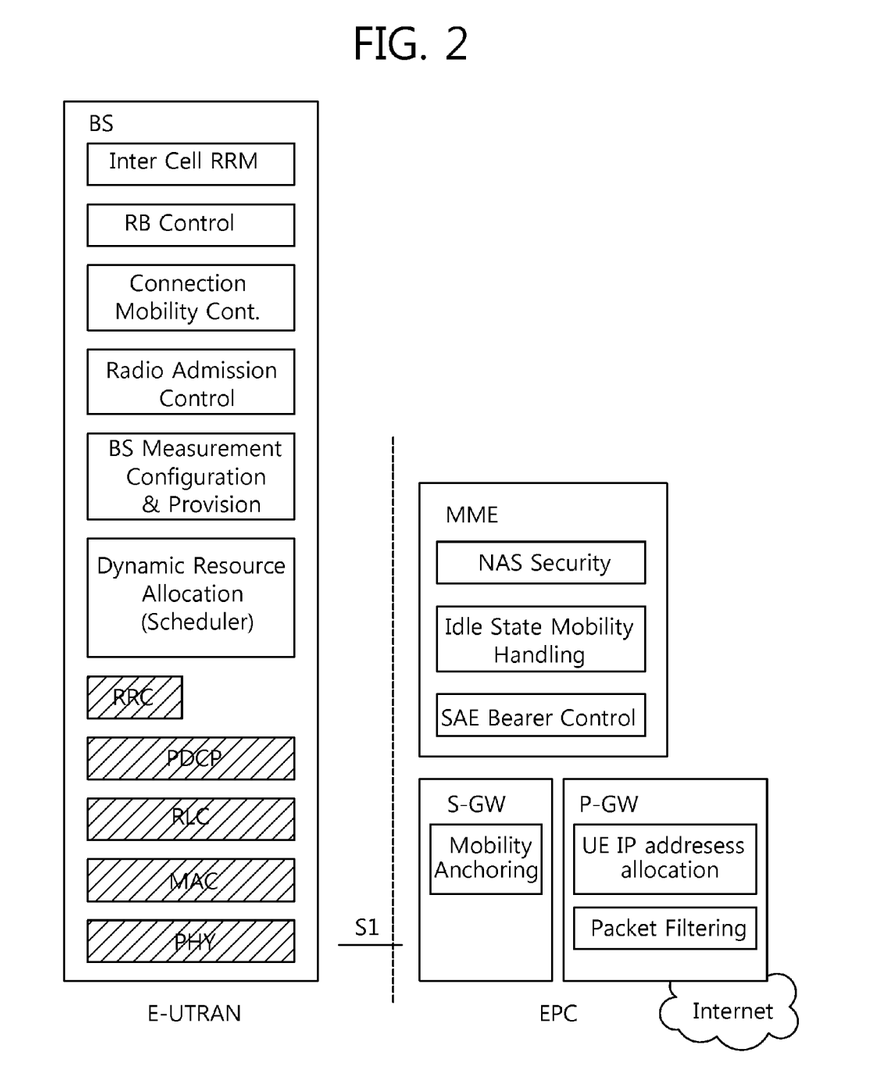
FIG. 2 is a block diagram showing functional split between the E-UTRAN and the EPC.

FIG. 2 is a block diagram showing functional split between the E-UTRAN and the EPC. Slashed boxes depict radio protocol layers and white boxes depict the functional entities of the control plane. A BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling. The MME hosts the following functions. (1) NAS (Non-Access Stratum) signaling, (2) NAS signaling security, (3) Idle mode UE Reachability, (4) Tracking Area list management, (5) Roaming and (6) Authentication. The S-GW hosts the following functions. (1) Mobility anchoring and (2) lawful interception. The PDN gateway (P-GW) hosts the following functions. (1) UE IP (internet protocol) allocation and (2) packet filtering.

Figure 3:
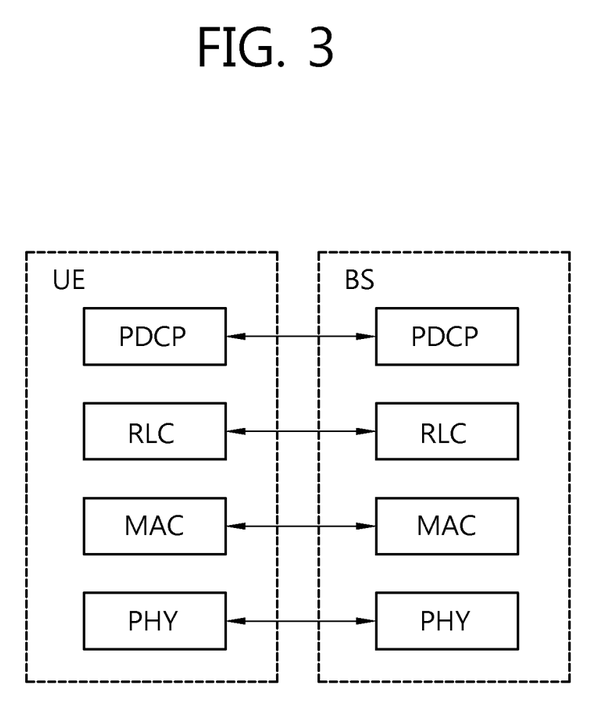
FIG. 3 is a block diagram showing radio protocol architecture for a user plane.
Figure 4:
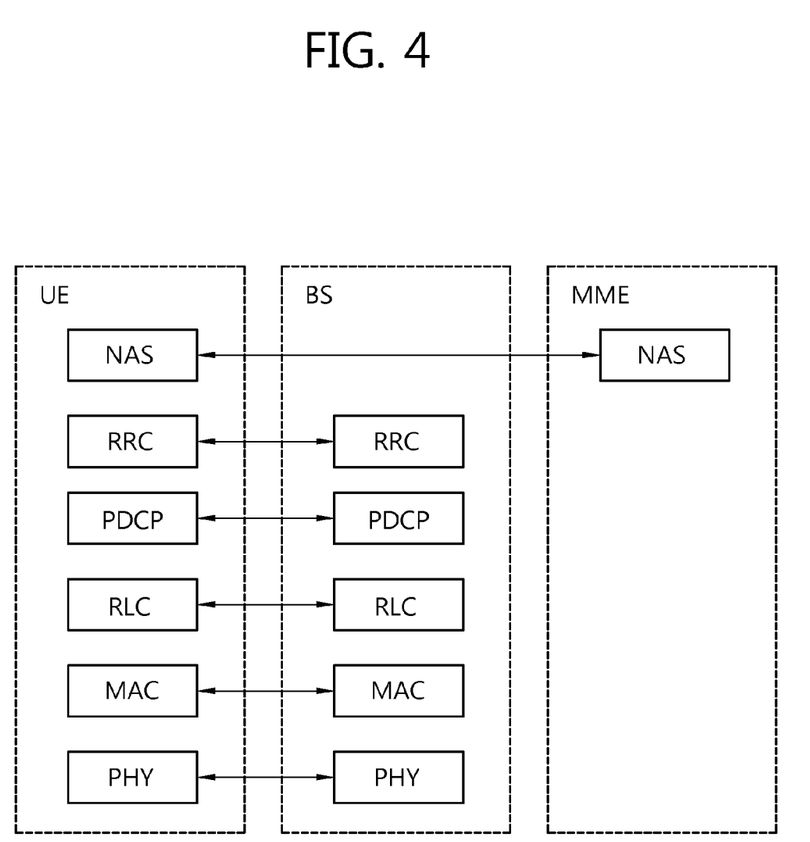
FIG. 4 is a block diagram showing radio protocol architecture for a control plane.

FIG. 3 is a block diagram showing radio protocol architecture for a user plane. FIG. 4 is a block diagram showing radio protocol architecture for a control plane. The data plane is a protocol stack for user data transmission and the control plane is a protocol stack for control signal transmission.

Referring to FIGS. 3 and 4, a physical (PHY) layer provides information transfer services to an upper layer by using a physical channel. The PHY layer is connected with a MAC (Medium Access Control) layer, i.e., an upper layer of the PHY layer, through transport channels. Data is transferred between the MAC layer and the PHY layer through the transport channels. The transport channels are classified by how and with what characteristics data are transferred over the radio interface. Between different physical layers, i.e., the physical layer of a transmitter and the physical layer of a receiver, data is transferred through the physical channel.

There are several physical control channels used in the physical layer. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NACK signals in response to uplink transmissions. A physical uplink control channel (PUCCH) carries uplink control information such as HARQ ACK/NACK in response to downlink transmission, scheduling request and channel quality indicator (CQI). A physical uplink shared channel (PUSCH) carries uplink shared channel (UL-SCH).

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels. Logical channels may be classified into two groups: control channels for the transfer of control plane information and traffic channels for the transfer of user plane information.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ) scheme.

The functions of a PDCP (Packet Data Convergence Protocol) layer for the user plane include transfer of user data, header compression/decompression and ciphering/deciphering. The functions of the PDCP layer for the control plane include transfer of control plane data, and ciphering and integrity protection.

The RRC (Radio Resource Control) layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

A NAS (Non-Access Stratum) layer belonging to the upper layer of the RRC layer serves to perform session management and mobility management.

Figure 5:
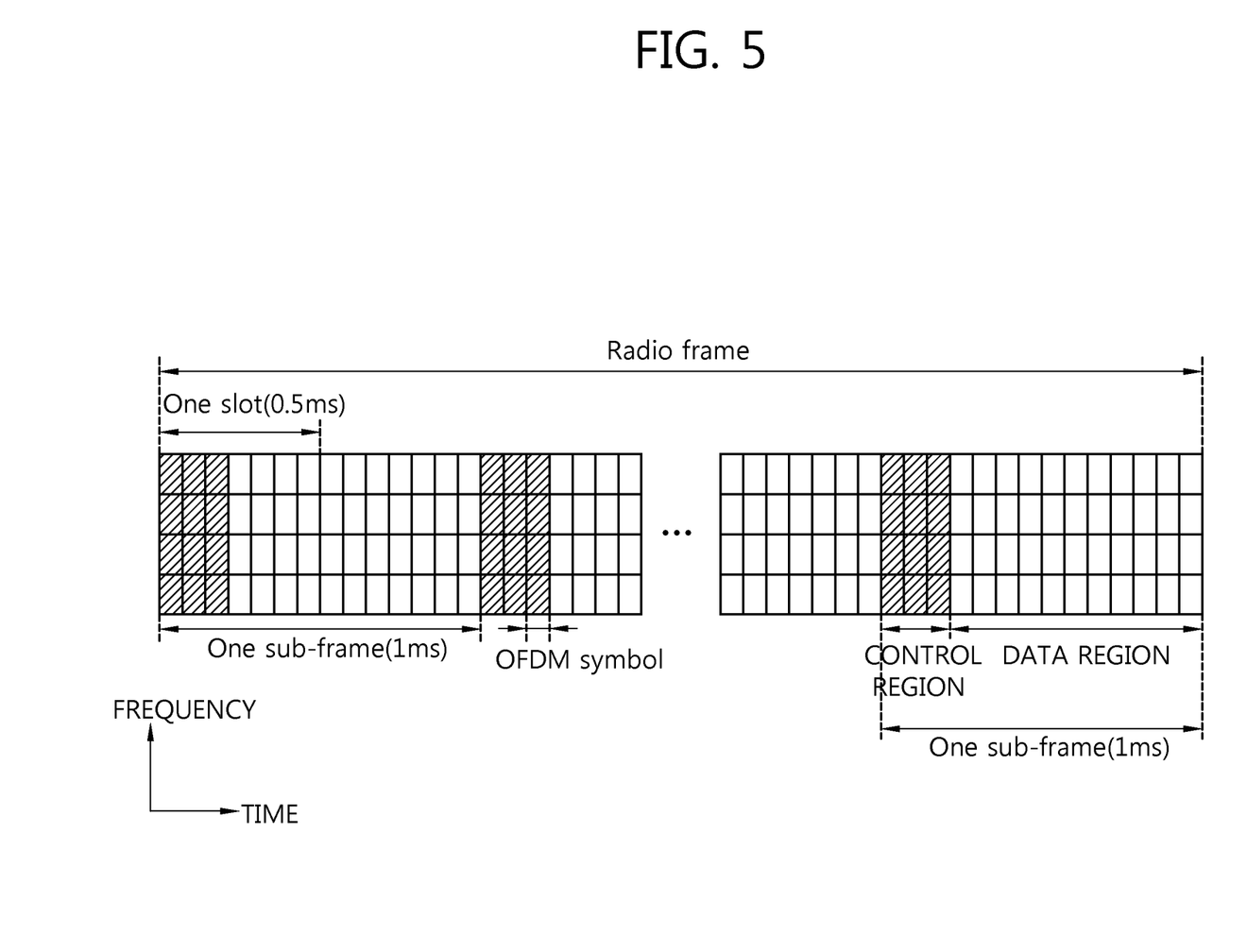
FIG. 5 shows an example of a radio frame structure.

FIG. 5 shows an example of a radio frame structure.

Referring to FIG. 5, a radio frame includes 10 subframes, and a subframe includes 2 slots. The time used to transmit a subframe is referred to as a transmission time interval (TTI). For example, the length of a subframe is 1 ms and the length of a slot can be 0.5 ms.

One slot includes a plurality of orthogonal frequency division multiplexing (OFDM) symbols in time domain. In a normal cyclic prefix (CP), a slot includes 7 OFDM symbols, and in an extended CP, a slot includes 7 OFDM symbols.

An OFDM symbol is for expression of a symbol duration in time domain because OFDMA is used for downlink transmission in 3GPP LTE, the OFDM symbol can be regarded as a SC-FDMA symbol or symbol duration.

A resource block is a unit of resource assignment in 3GPP LTE, and it includes a plurality of consecutive subcarriers, i.e. 12 subcarriers, in a slot.

As shown in 3GPP TS 36.211 V8.5.0 (2008-12) "Evolved Universal Terrestrial Radio Access (E-UTRA); Physical Channels and Modulation (Release 8)", a physical channel in LTE is divided into PDSCH (Physical Downlink Shared Channel), PUSCH (Physical Uplink Shared Channel) and PDSCH (Physical Downlink Control Channel)과 PUCCH (Physical Uplink Control Channel).

A subframe is divided into a control region and a data region in time domain. The control region comprises at most three OFDM symbols in a first slot of a subframe, and the number of OFDM symbols in the control region can be various. PDCCH is allocated to the control region, and PDSCH is allocated to the data region.

Figure 6:
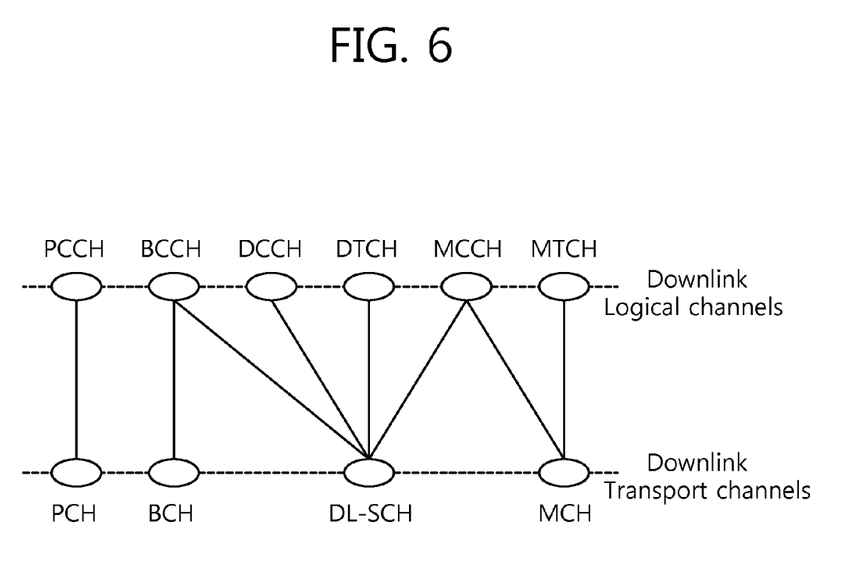
FIG. 6 shows mapping between downlink logical channels and downlink transport channels.

FIG. 6 shows mapping between downlink logical channels and downlink transport channels.

Referring to FIG. 6, a paging control channel (PCCH) can be mapped to a paging channel (PCH). A broadcast control channel (BCCH) can be mapped to a broadcast channel (BCD) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and a network and is used for UEs having no RRC connection with the network. The MCCH is a point-to-multipoint downlink channel used for transmitting multimedia broadcast multicast service (MEMS) control information from the network to the UE for one or several MTCHs and is only used by UEs that receive MBMS. The DCCH is a point-to-point bi-directional channel that transmits dedicated control information between a UE and the network and is used by UEs having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARQ), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Figure 7:
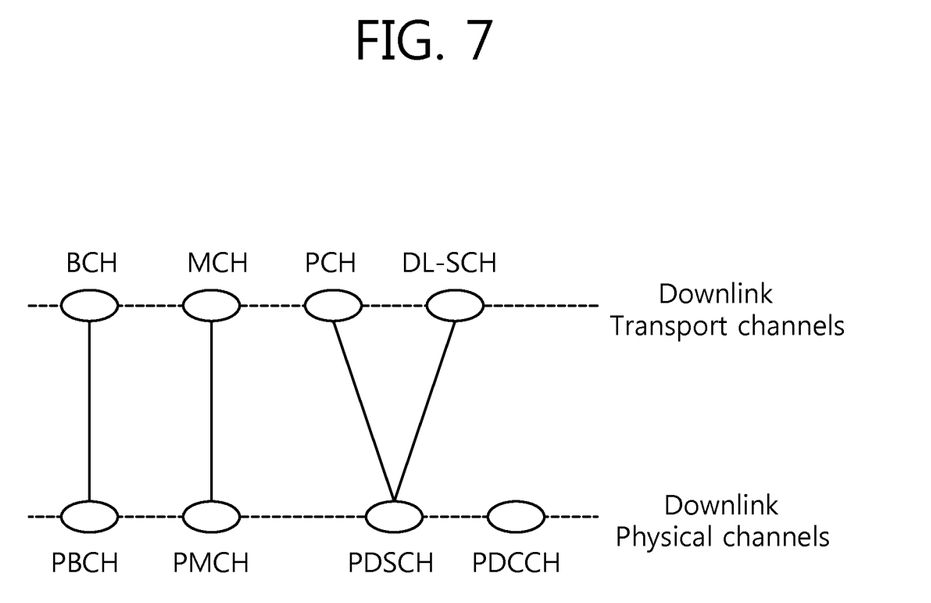
FIG. 7 shows mapping between downlink transport channels and downlink physical channels.

FIG. 7 shows mapping between downlink transport channels and downlink physical channels.

Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

A multimedia broadcast multicast service (MBMS) uses two logical channels, that is, an MCCH (i.e., a control channel) and an MTCH (i.e., a traffic channel). User data (e.g., actual voice or video) is transmitted on the MTCH. Configuration information for receiving the MTCH is transmitted on the MCCH. The MTCH and the MCCH are point-to-multipoint downlink channels for a plurality of UEs and can be regarded as common channels. In the MBMS, an amount of allocated radio resources does not coincide with the number of UEs receiving services. Instead, only radio resources for the common channels are allocated and the common channels are simultaneously received by the plurality of UEs, thereby improving efficiency of the radio resources.

System information is structured by means of System Information Blocks (SIBs), each of which contains a set of functionally-related parameters. The SIB types include (a) The Master Information Block (MIB), which includes a limited number of the most frequently transmitted parameters which are essential for a UE's initial access to the network, (b) System Information Block Type 1 (SIB1), which contains parameters needed to determine if a cell is suitable for cell selection, as well as information about the time domain scheduling of the other SIBs. (c) System Information Block Type 2 (SIB2), which includes common and shared channel information. (d) SIB3-SIB8, which include parameters used to control intra-frequency, inter-frequency and inter-RAT cell reselection. (e) SIB13, as MBMS system information, which includes parameters required to acquire the MBMS control information associated with one or more MBMS single frequency network (MBSFN) areas.

If MBSFN areas dynamically change, cells will be added to or removed from an MBSFN area in short intervals, in which case SIB13 content would change quite often. If UE monitors paging or value tag in SIB1 to verify the change of the MBMS system information, then frequent change of SIB13 might lead non-MBMS (i.e. unicast) UEs to wake up frequently and unnecessarily for reception of paging and system information, since SIB13 change will be also indicated on paging or result in update of value tag in SIB1.

Figure 8:
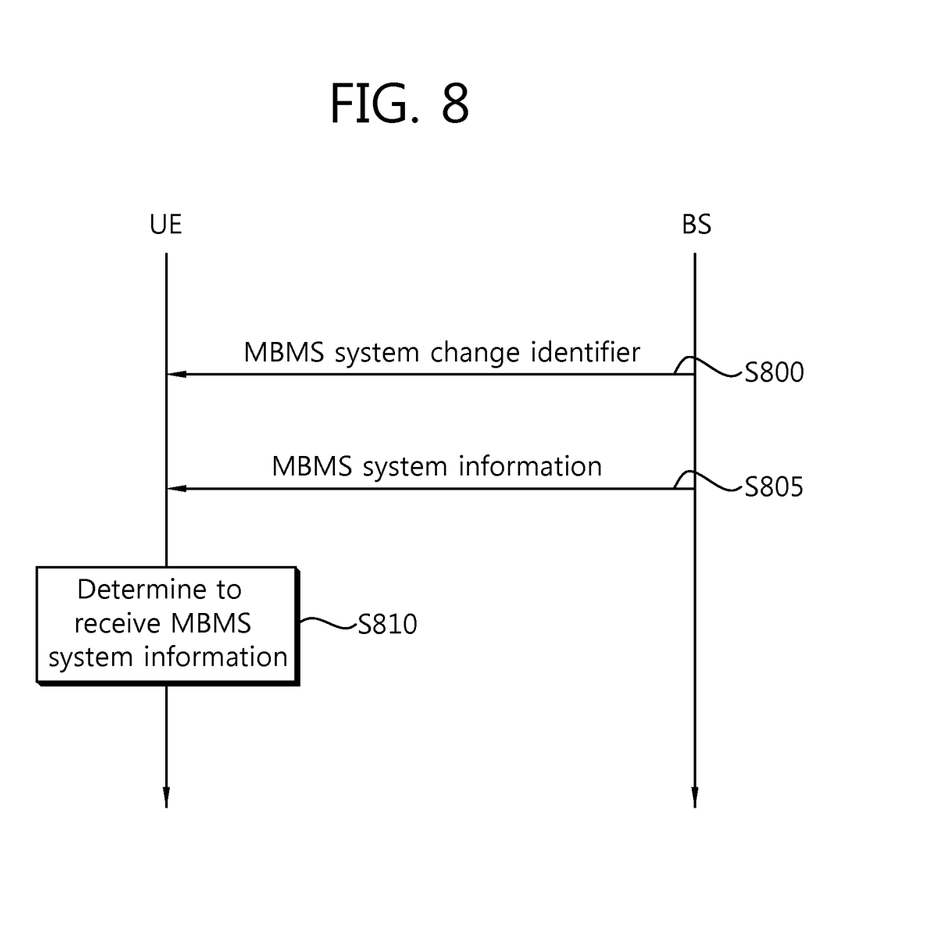
FIG. 8 shows a flowchart illustrating a method of transmitting MBMS system information according to an embodiment of the present invention.

FIG. 8 shows a flowchart illustrating a method of transmitting MBMS system information according to an embodiment of the present invention.

Referring to FIG. 8, a base station (BS) transmits MBMS system change identifier to a user equipment (UE) S800. The MBMS system change identifier, dedicated to MBMS receiving UEs, indicates if MBMS system information, included in SIB13, is currently changed from the previous state at the point of transmission of the MBMS system change identifier. For example, if the MBMS system information is changed, the value of the MBMS system change identifier is modified. Then the current value of the MBMS system change identifier is different from the previous one of the MBMS system change identifier. For another example, if the MBMS system information is not changed, the value of the MBMS system change identifier is maintained and not modified. Then the current value of the MBMS system change identifier is the same as the previous one of the MBMS system change identifier.

The BS may continuously or periodically monitor if there is any change in the MBMS system information to determine the value of the MBMS system change identifier. The BS may transmit MBMS data as well as the MBMS system change identifier.

The BS transmits the MBMS system information to the UE S805. The MBMS system information may be a new one or the old one same as previously transmitted.

The UE determines whether to receive the MBMS system information on BCCH S805. The UE reads the MBMS system information if the MBMS system change identifier indicates the change of the MBMS system information. Otherwise, the UE doesn't read the MBMS system information on BCCH. After receiving the changed MBMS system information on BCCH, the UE updates its system by applying the changed MBMS system information to the UE, and the UE receives MBMS related information (i.e. MCCH or MTCH) based on the changed MBMS system information.

In an embodiment, the MBMS system change identifier is a field in downlink control information (DCI). One example of DCI is DCI format 1 as shown in Table 1.

TABLE 1

Resource allocation header (resource allocation type 0/type 1) - 1 bit
Resource block assignment:
    For resource allocation type 0
        $\lceil N_{RB}^{DL}/P \rceil$ bits provide the resource allocation
    For resource allocation type 1
        $\lceil \log_2(P) \rceil$ bits of this field are used as a header specific to this
        resource allocation type to indicate the selected resource blocks
        subset
        1 bit indicates a shift of the resource allocation span
        ($\lceil N_{RB}^{DL}/P \rceil - \lceil \log_2(P) \rceil - 1$) bits provide the resource allocation
    where the value of P depends on the number of DL resource blocks
Modulation and coding scheme - 5 bits
HARQ process number - 3 bits (FDD), 4 bits (TDD)
New data indicator - 1 bit
Redundancy version - 2 bits
MBMS system change identifier for indicating the change of MBMS
system information - 1 bit
Power Indicator for PUCCH - 2 bits
Downlink Assignment Index (this field is present in TDD for all the
    uplink-downlink configurations and only applies to TDD operation with
    uplink-downlink configuration 1-6. This field is not present in FDD) -
    2 bits Referring to Table 1, DCI format 1 includes resource allocation header field, resource block assignment field, modulation and coding scheme field, new data indicator field, HARQ process number field, Redundancy version field, MBMS system change identifier field, power indicator field, and downlink assignment index field. 1 bit is used for the MBMS system change identifier field. But this is for exemplary purpose only, and the M BMS system change identifier can have different number of bits. For instance, the MBMS system change identifier comprises at least two bits and the at least two bits are used as a MBMS specific value tag in SIB1.

The DCI is carried on PDCCH. The PDCCH for the DCI including the MBMS system change identifier is masked by MBMS specific radio network temporary identifier (RNTI) called M-RNTI. The PDCCHs for notifying the change of MBMS system information are identified by the M-RNTI. The DCI format 1C with M-RNTI is used for notification and includes a bitmap to indicate the one or more MBSFN Area(s) in which the MCCH change(s).

Even if modification of the system information is indicated in paging or value tag in SIB1 is updated, MBMS UEs do not consider SIB13 changes. Also, when the MBMS system information in SIB13 changes, the network does not update the value tag in SIB1 and also does not indicate modification of system information in a paging message.

The MBMS UE can detect the change of the MBMS system information in the following procedure. (a) The MBMS UE periodically receives PDCCH with M-RNTI in order to recognize change of MCCH information on a certain MBSFN area by checking the MBSFN ID and change of SIB13 by checking the MBMS system change identifier. (b) If the MBMS system change identifier included in DCI on the PDCCH is set to 1, the MBMS UE considers that SIB13 changes. Then, the MBMS UE receives the SIB13 broadcast on BCCH. On the other hand, if the MBMS system change identifier in DCI on the PDCCH is set to 0, the MBMS UE considers that SIB13 does not change. Thus, UE does not receive SIB13.

In another embodiment, the MBMS system change identifier is an MBMS specific value tag in SIB1. Instead of periodic reading of SIB13, UE could periodically read the MBMS system change identifier in SIB1. The MBMS system change identifier is different from the existing value tag in SIB1. To avoid unnecessary wake-up of unicast UEs, change of the MBMS system change identifier should not trigger any paging with system information modification. In this case, if SIB13 changes, the network increases the MBMS system change identifier. Whenever an MBMS UE receives a new MBMS system change identifier, the MBMS UE verifies whether the stored one and the new one are same or not. If they are different, the MBMS UE considers SIB13 changed, stores the MBMS system change identifier, and then reads SIB13. Otherwise, UE does not read SIB13.

Figure 9:
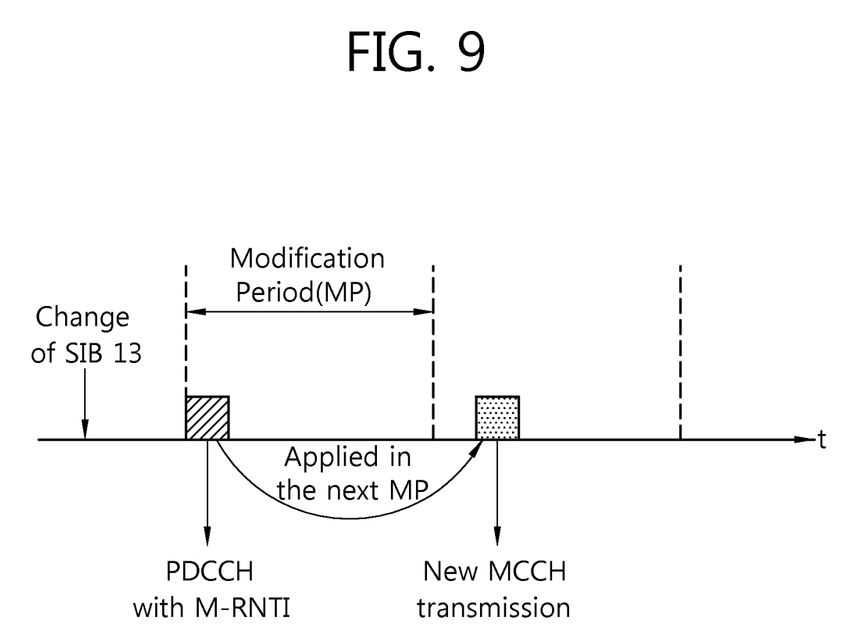
FIG. 9 illustrates the timing of applying the change of MBMS system information to the MBMS system change identifier according to an embodiment of the present invention.

FIG. 9 illustrates the timing of applying the change of MBMS system information to the MBMS system change identifier according to an embodiment of the present invention.

Referring to FIG. 9, PDCCH with M-RNTI and MCCH can change only at MCCH Modification Period (MP) boundaries. And PDCCH with M-RNTI is indicated one MP before MCCH transmission. Thus, if any MBSFN area information in SIB13 is added, modified, or removed, the change in SIB13 should be applied to PDCCH with M-RNTI one MP before being applied to MCCH(s). As a result, UEs consider that changes in SIB13 are applied to PDCCH with M-RNTI one MP before being applied to MCCH(s).

In addition, if SIB13 content is added, modified, or removed in the midst of a MP, a new SIB13 content cannot be applied to PDCCH with M-RNTI in this MP because PDCCH with M-RNTI before transmission of new SIB13 content is based on old SIB13 content in this MP. Thus, if SIB13 content is added, modified or removed, the network should apply the change to PDCCH with M-RNTI in the next MP, not in this MP after changing SIB13 content. As a result, UE assumes that the recent update of SIB13 is applied to PDCCH with M-RNTI in the next MP after receiving the recent update of SIB13.

Figure 10:
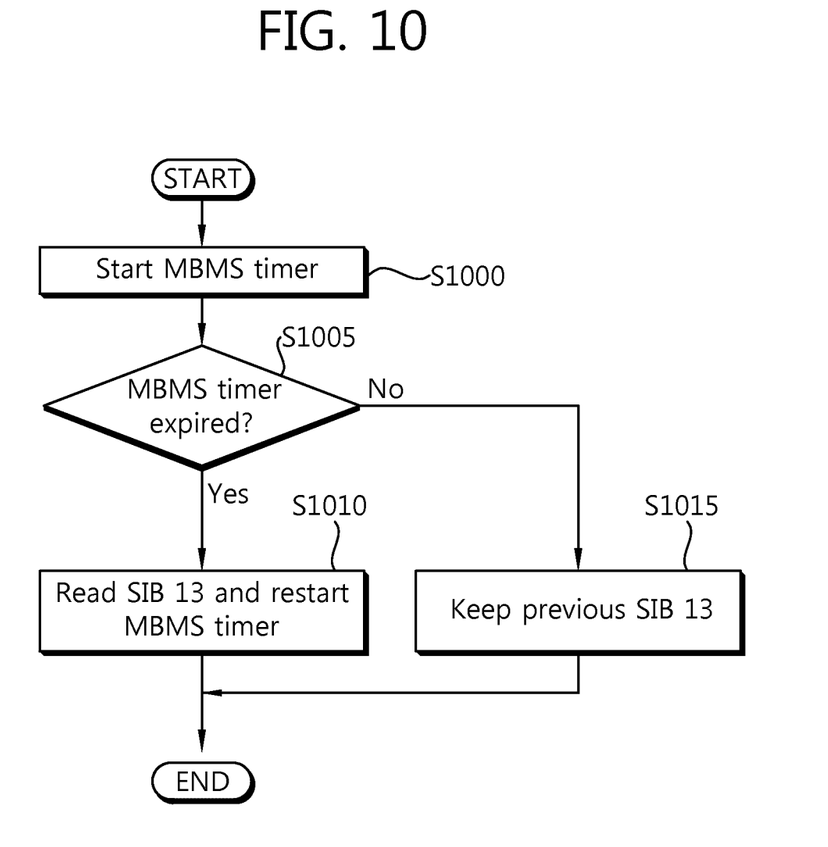
FIG. 10 shows a flowchart illustrating a method of receiving MBMS system information based on a timer according to an embodiment of the present invention.

FIG. 10 shows a flowchart illustrating a method of receiving MBMS system information based on a timer according to an embodiment of the present invention.

Referring to FIG. 10, a UE starts an MBMS timer S1000. The MBMS timer indicates the timing when the UE needs to read SIB13 content. The UE can be an MBMS capable UE or a unicast UE.

The UE checks if the MBMS timer expires S1005. Whenever the timer expires in a predefined time, the UE reads SIB13 and the UE restarts the MBMS timer when the UE finishes reading SIB13 S1010. In this case, the MBMS timer or the period for reading SIB13 can be signaled by SIB1 which signals SI scheduling information or by SIB2 which signals the MBSFN subframe configuration. In this manner, if SIB13 dynamically changes, the UE could periodically read SIB13 content. If the MBMS timer doesn't expire, the UE keeps the previous SIB13 S1015.

The aforementioned functions can be executed by processors such as microprocessors, controllers, microcontrollers, application specific integrated circuits (ASICs) and so on according to software or program codes coded to execute the functions. The design, development and implementation of the codes are obvious to those skilled in the art.

While the present invention has been particularly shown an described with reference to exemplary embodiments thereof, it will be understood by those of ordinary skill in the art that various changes in form and details may be made therein without departing from the spirit and scope of the present invention as defined by the following claims.

What is claimed is:

1. A method of receiving system information performed by a user equipment (UE), the method comprising:
   receiving, from a network, an indicator indicating a change of system information related to a point-to-multipoint service on a physical control channel; and
   receiving changed system information related to the point-to-multipoint service in response to the indicator,
   wherein the point-to-multipoint service is a multimedia broadcast multicast service (MBMS),
   wherein the indicator is included within a system change identifier field of a downlink control information (DCI),
   wherein the system change identifier field has one bit,
   wherein a format of the DCI further includes at least one of: a resource allocation header field, a resource block assignment field, a modulation and coding scheme field, a new data indicator field, a hybrid automatic repeat request (HARQ) process number field, a redundancy version field, and a downlink assignment index field,
   wherein the format of the DCI further includes a bit map to indicate one or more Multimedia Broadcast multicast service Single Frequency Network (MBSFN) areas in which the system information is changed, and
   wherein the changed system information related to the point-to-multipoint service is received through a system information block (SIB) type thirteen.

2. The method of claim 1, wherein the physical control channel is a physical downlink control channel (PDCCH).

3. The method of claim 2, wherein the point-to-multipoint service is a multimedia broadcast multicast service (MBMS) and an MBMS Radio Network Temporary Identifier (M-RNTI) is received on the PDCCH.

4. The method of claim 3, wherein a Multimedia Broadcast multicast service Single Frequency Network (MBSFN) area identifier is received on the PDCCH.

5. The method of claim 1, further comprising receiving MBMS control information through a Multicast Control Channel (MCCH) based on the changed system information related to the point-to-multipoint service.

6. The method of claim 5, wherein the indicator is received during a first modification period and the MBMS control information is received during a second modification period, and wherein the second modification period is a next modification period of the first modification period.

7. A method of transmitting system information performed by a network, the method comprising:
   transmitting, to a user equipment (UE), an indicator indicating a change of system information related to a point-to-multipoint service on a physical control channel; and
   transmitting, to the UE, changed system information related to the point-to-multipoint service after transmitting the indicator,
   wherein the point-to-multipoint service is a multimedia broadcast multicast service (MBMS),
   wherein the indicator is included within a system change identifier field of a downlink control information (DCI),
   wherein the system change identifier field has one bit,
   wherein a format of the DCI further includes at least one of a resource allocation header field, a resource block assignment field, a modulation and coding scheme field, a new data indicator field, a hybrid automatic repeat request (HARQ) process number field, a redundancy version field, and a downlink assignment index field,
   wherein the format of the DCI further includes a bit map to indicate one or more Multimedia Broadcast multicast service Single Frequency Network (MBSFN) areas in which the system information is changed, and
   wherein the changed system information related to the point-to-multipoint service is transmitted through a system information block (SIB) type thirteen.

8. The method of claim 7, wherein the physical control channel is a physical downlink control channel (PDCCH).

9. The method of claim 8, wherein the point-to-multipoint service is a multimedia broadcast multicast service (MBMS) and an MBMS Radio Network Temporary Identifier (M-RNTI) is transmitted on the PDCCH.

10. The method of claim 9, wherein a Multimedia Broadcast multicast service Single Frequency Network (MBSFN) area identifier is transmitted on the PDCCH.

11. The method of claim 7, further comprising transmitting, to the UE, MBMS control information through a Multicast Control Channel (MCCH) after transmitting the changed system information related to the point-to-multipoint service.

12. The method of claim 11, wherein the indicator is transmitted during a first modification period and the MBMS control information is transmitted during a second modification period, and wherein the second modification period is a next modification period of the first modification period.

* * * * *